Dec. 25, 1923. 1,478,542
L. A. BEAN
DIRECTION INDICATOR FOR AUTOMOBILES
Filed June 18, 1921
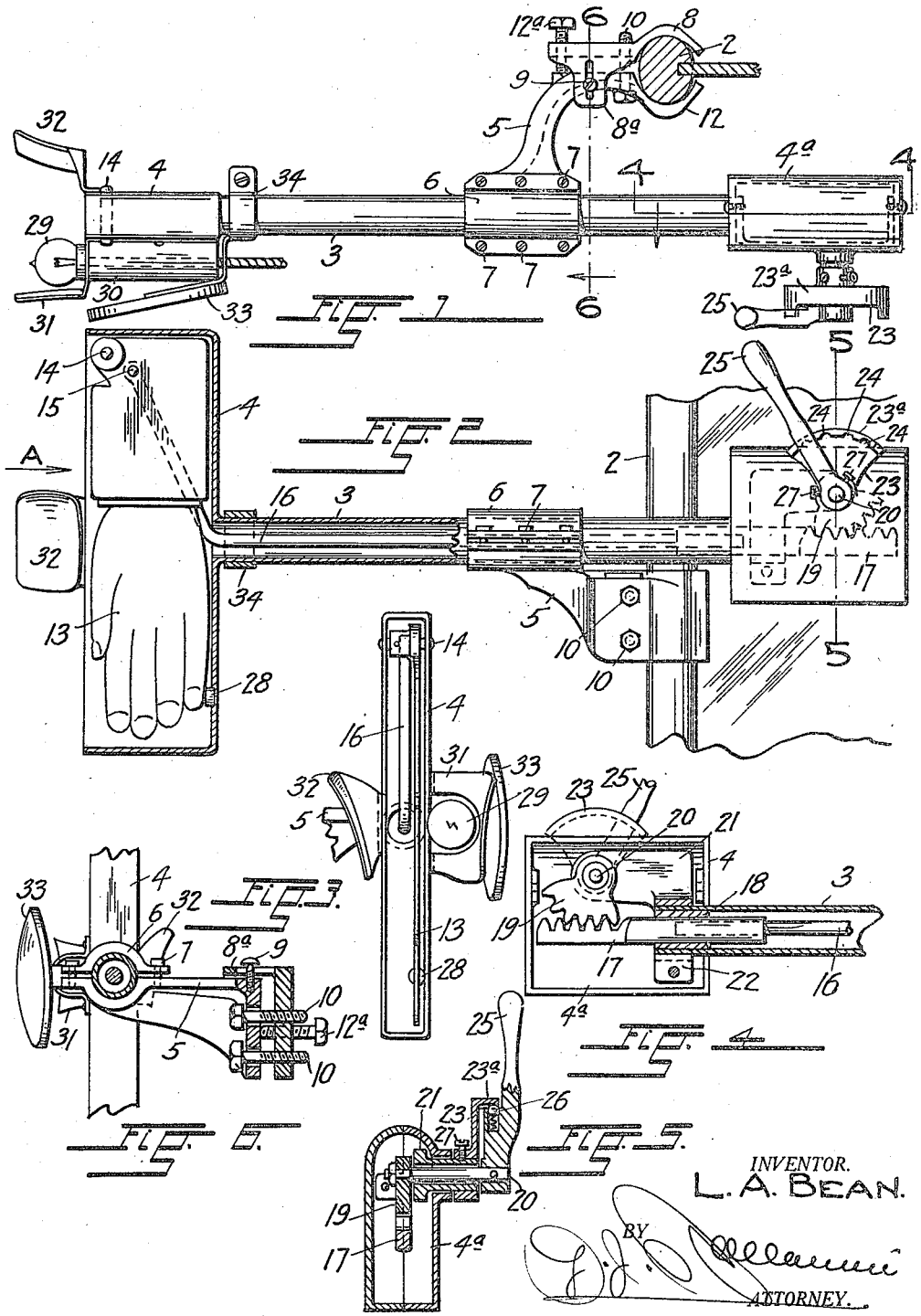
INVENTOR.
L. A. BEAN.
BY
ATTORNEY.

Patented Dec. 25, 1923.

1,478,542

UNITED STATES PATENT OFFICE.

LOUIS A. BEAN, OF DENVER, COLORADO.

DIRECTION INDICATOR FOR AUTOMOBILES.

Application filed June 18, 1921. Serial No. 478,683.

*To all whom it may concern:*

Be it known that I, LOUIS A. BEAN, a citizen of the United States, residing at Denver, in the county of Denver and State of Colorado, have invented certain new and useful Improvements in Direction Indicators for Automobiles, of which the following is a specification.

This invention relates to direction indicators for automobiles and more particularly to indicating devices of the type shown and described in my application for Patent No. 403,712, filed August 16, 1920.

It is an object of the present invention to provide in an indicator of the above mentioned character, certain improvements which simplify its construction, facilitate its operation and adapt it for use on different makes of motor vehicles including those equipped with a closed top.

Another object of the invention is to provide an improved method of illuminating the signal at night.

A further object is to provide in connection with the support of the indicator, an adjustable mirror which enables the driver of the vehicle to observe the movement of cars approaching at the rear thereof, and still other objects reside in the provision of improved means to move the signal blade of the device to its predetermined positions, and in other details of construction and arrangements of parts hereinafter fully described with reference to the accompanying drawings, in the several views of which like parts are similarly designated, and in which Figure 1 is a top view of the direction indicator in its operative position with relation to a side post of the windshield or other similarly disposed part of a motor vehicle;

Figure 2, a partially sectional side elevation of the same;

Figure 3, an end view of the semaphore casing of the indicator looking in the direction of the arrow A, Figure 1.

Figure 4, a fragmentary section along the line 4—4, Figure 1, looking in the direction of the arrow drawn across said line;

Figure 5, a section taken on the line 5—5, Figure 2, and

Figure 6, a section taken on the line 6—6, Figure 1.

In the drawings the reference character 2 designates an upright part of a motor vehicle suitable for the attachment of the direction indicator.

In open vehicles the part best adapted for the purpose is the side post of the wind shield at the driver's side, while in closed cars of the type generally known as coupés, sedans or limousines a correspondingly located member of the body frame is most suitable as a means for securing the outwardly projecting element of the indicator.

As in the construction disclosed in the application for patent hereinbefore referred to, the indicator comprises in combination with a suitable support, a pivoted signal blade preferably made in the form of an open hand which through the instrumentality of an operating mechanism within easy reach of the driver of the vehicle, may be placed in any of a plurality of predetermined positions to indicate changes in the direction or the speed of the vehicle according to a code adopted in many states and municipalities.

The supporting element consists of a tubular arm 3, a semaphore casing 4 at the outer end thereof which in practice extends beyond a side of the vehicle body, and a gear casing 4ª at the other end of the same which is within reach of the driver of the car.

The support is fastened to the upright part of the windshield or body frame of the automobile by means of a clamp of novel construction which permits of the application of the device to vehicle parts of different sizes and forms and of adjusting the supporting element to any desired position with relation thereto.

The clamp is formed at the end of an angular bracket 5 which at its opposite end has a sleeve 6 for its attachment to the tubular arm of the indicator. The sleeve is made in two complementary sections one of which is formed integrally with the bracket and the other of which is removably secured thereto by a number of screws 7.

The clamp consists of two cooperating jaws 12 and 8 one of which is formed integral at the outer end of the bracket and the other of which is pivotally secured by means of screws 9 which extend through slots in parallel ears 8ª at opposite sides of the bracket.

A pair of screws 10 which extend loosely through apertures in the bracket, cooperate with threaded openings in the loose jaw 8 to adjust the space between the jaws and a set screw 12ª passing through a threaded hole in the tail end of the moving jaw, engages with the bracket to lock the jaw in clamping engagement with the part of the vehicle to which the clamp is applied.

The signal blade 13 of the indicator which normally is concealed in the casing 4 at the outer end of the arm, is pivoted at its upper end, as at 14, to swing outwardly to either a downwardly slanting, a horizontal or an upwardly directed position, through the medium of an operating mechanism the construction of which will now be described.

A wrist pin 15 on the semaphore blade at a short distance from its pivot, provides a crank connection for the upturned end portion of a sliding rod 16 which extends loosely through the tubular arm of the support.

A rack bar 17 which is slidably supported in a bushing 18 at the end of the arm at which it connects with the gear case, is socketed for its attachment to the corresponding extremity of the rod and it meshes with a segmental gear 19 at the end of a spindle 20 which projects through a bearing 21 at a side of the gear case.

The bearing consists of a sleeve fitted in an opening of the gear case and formed on a bracket which is secured to the end of the arm 3 inside the casing by means of a clamp 22.

A segment 23 attached to the bearing outside the gear case has an outwardly extending peripheral flange 23ª the under surface of which has a plurality of transverse notches 24, and an operating handle 25 connected at the end of the spindle 20 carries a spring pressed ball 26 which cooperates with the notches to hold the handle in its adjusted positions.

The notches are arranged to determine the three indicative positions of the signal blade hereinbefore referred to and the segment is fastened at the end of the bearing by set screws 27 to permit of its relative adjustment.

A rubber stop 28 inside the casing 4 deadens the impact of the semaphore blade when it is retracted and an incandescent lamp 29 fastened at a side of the casing is provided to illuminate the blade in its projecting position. The lamp which is screwed into a socket 30 formed on the outside of the casing is, in practice, connected in an electric circuit of the motor vehicle and its light rays are reflected to illuminate both sides of the projecting blade by two oppositely disposed upwardly diverging, slightly convexed deflectors 31 and 32, preferably made of polished metal, which are fastened at opposite sides of the opening of the case through which the blade moves outwardly thereof.

A back-sight mirror 33 which enables the driver of a vehicle to which the direction indicator is applied to observe the movement of cars approaching at the rear thereof, is adjustably fastened to the tubular arm of the support by means of a clamping ring 34.

It will be seen that by movement of the handle to the position predetermined by the entrance of its ball-detent into the notches of the segment 23, a longitudinal sliding movement is imparted to the rod 16 through the instrumentality of the rack and gear and that the movement of the rod will cause the signal blade to turn about its pivot to assume its indicatory positions outside the casing in which it is normally concealed.

Having thus described my invention what I claim and desire to secure by Letters Patent is:

1. A direction indicator for automobiles comprising a hollow arm, a support at an end thereof, a pivoted signal blade on the support, a longitudinally sliding rod in the arm, having a bent arm in pivotal connection with the blade, and a rotary operating element at the opposite end of the arm, in operative connection with the rod.

2. A direction indicator for automobiles comprising a support, a signal blade pivotally connected therewith at one of its ends for movement to a position in which it projects outwardly from the support, and a longitudinally movable rod having a bent arm pivotally connected with the blade at a distance from the pivot thereof, thereby producing a crank to effect the pivotal movement of the blade by longitudinal movement of the rod.

In testimony wherof I have affixed my signature.

LOUIS A. BEAN.